May 23, 1967 W. H. HARPER 3,321,717

LOW-LOSS, BROADBAND, PROGRAMMABLE
MONOPULSE BEAM-SELECTOR SWITCH

Filed Sept. 7, 1965 2 Sheets-Sheet 1

INVENTOR
WILLIS H. HARPER

BY R S Sciascia

ATTORNEY

May 23, 1967

W. H. HARPER

LOW-LOSS, BROADBAND, PROGRAMMABLE MONOPULSE BEAM-SELECTOR SWITCH 3,321,717

Filed Sept. 7, 1965

2 Sheets-Sheet 2

INVENTOR
WILLIS H. HARPER

BY [signature]

ATTORNEY 3,321,717
LOW-LOSS, BROADBAND, PROGRAMMABLE MONOPULSE BEAM-SELECTOR SWITCH

Willis H. Harper, Oxon Hill, Md., assignor to the United States of America as represented by the Secretary of the Navy Filed Sept. 7, 1965, Ser. No. 485,652
5 Claims. (Cl. 333—7)

The invention described herein may be manufactured and used by or for the Government of the United States of America for governmental purposes without the payment of any royalties thereon or therefor.

The present invention relates generally to an improved selector switch and more particularly to a programmable beam selector switch characterized by low loss and being operable over a broad band frequency range.

The inventive subject matter described herein is directed to a patentably distinct modification of the basic invention described in patent application Ser. No. 485,653, filed concurrently herewith.

High-performance fixed-array radar systems have heretofore involved complex and costly components which have served to hinder extensive development and use in this field. Such systems usually included active electronic elements which were frequency operable, and, accordingly subject to errors caused by uncontrollable frequency variations. Further, such components usually included numerous active sub-components thereby adding to the insertion loss caused from the extensive number of hook-ups required. This invention avoids the above economic and operational disadvantages insofar as providing an economical and positive acting switch.

In the aforementioned copending application, there is described a novel bilateral selector switch which has a single input terminal and which utilizes a novel strip transmission line arrangement having a plurality of varactor diodes that are biased in a predetermined manner according to a program of bias potentials. The instant invention is a modified improvement thereover so as to provide a unilateral selector switch having multiple input terminals for monopulse operation.

In accordance with the instant invention, there is provided a novel beam selector switch which has multiple input terminals and a single set of output terminals mounted on multi-layered strip transmission lines, each of which is formed by multi-layers of dielectric sheets having conductive strips etched thereon sandwiched between two conductive ground plates, to receive R.-F. monopulse signals. Unidirectional conductive means are positioned at predetermined intervals along the conductive strips and are adapted to be programmably biased in a conventional manner. Transition connectors are in the circuitry to provide means to connect conductive strips in adjacent strip-transmission lines.

It is accordingly a primary object of the present invention to provide a unique selector switch for monopulse operation.

Another object of the present invention is to provide a switch which is accurately operable over a wide frequency band with a minimum power loss.

A further object of the invention is to provide a selector switch having a plurality of inputs and a pair of outputs for monopulse operation.

Another object of the present invention is to provide a beam selector switch for use in an electronically steered radar system in which phasing is accomplished in passive transmission line components.

It is still a further object of the present invention to provide a single packaged selector switch which is inexpensive and simple to design and reproduce.

A significant object of this invention is to provide a multi-layer strip transmission line for allowing crossing over of adjacent conductive paths.

With these and other objects in view, as will hereinafter more fully appear, and which will be more particularly pointed out in the appended claims, reference is now made to the following description taken in connection with the accompanying drawings in which:

FIG. 1 of the drawing shows a fragmentary portion of the selector switch. Since only a portion of the entire switch containing one connector port, one diode mount and one transition point is shown, it should be understood that the rest of the switch is similarly arranged at each input-output diode and transition terminal.

Figure 1:
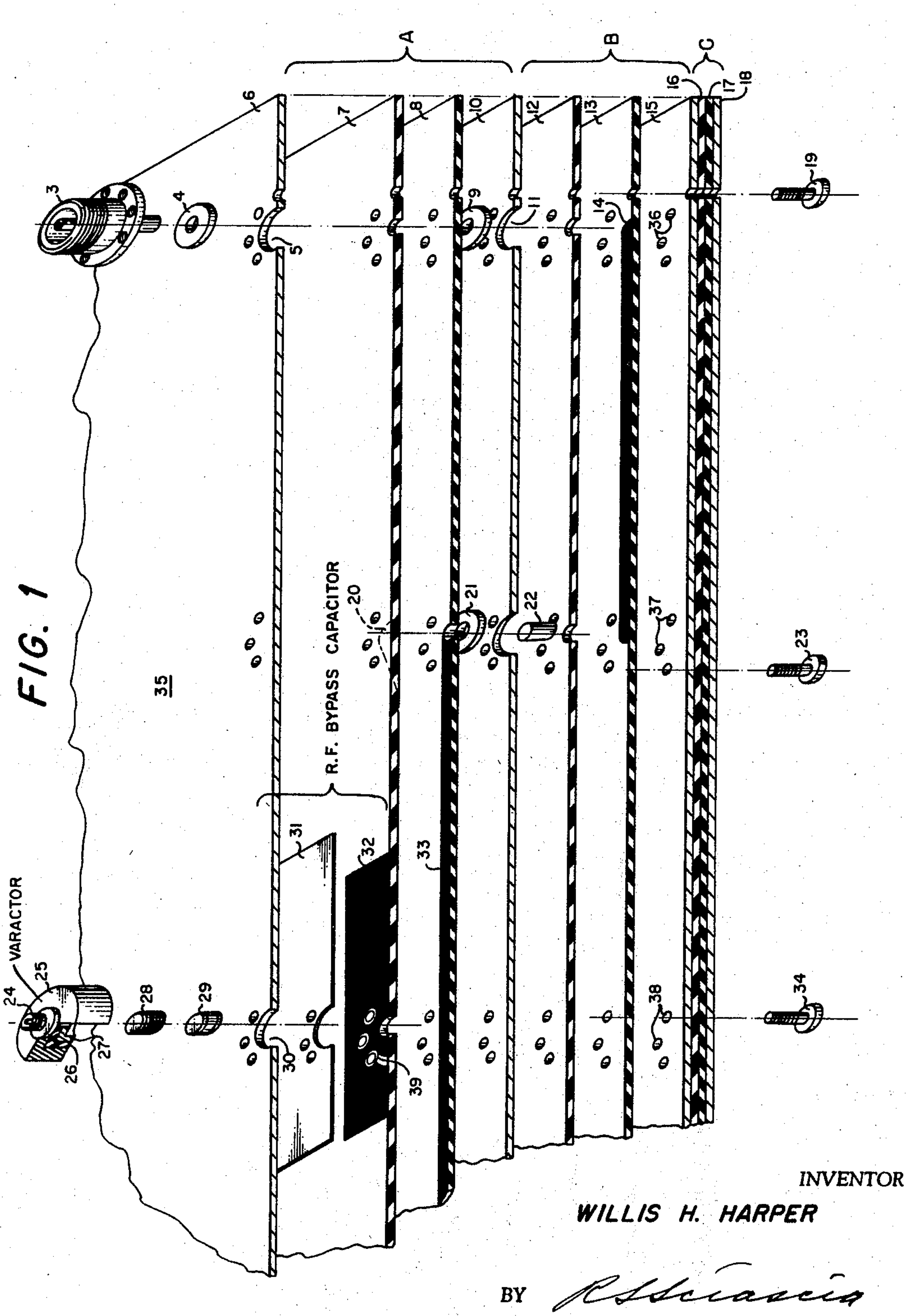

With reference now to FIG. 1 of the drawing, multi-layer strip-transmission line assembly 35 is formed by alternate layers of ground and stripline conductors. A first strip-transmission line A is formed in sandwich style with a pair of flat, conductor-carrying dielectric plates 7 and 8 supported between two flat conductive ground plates 6 and 10. Thus, with the conductors of such, for example as illustrated at 33, etched on dielectric plate 8, a basic transmission line is formed having characteristic impedance dependent upon ground-plate spacing, dielectric material constant and thickness and width of the center conductors on dielectric 8, as is well known in the transmission line art. Similarly arranged, second and third strip-transmission lines B and C are formed by members 10, 12, 13, 15 and 15, 16, 17, 18 respectively. Although only three layers of transmission lines are illustrated for purpose of explanation, any number of layered strip-transmission lines may be formed.

To hold the strip-transmission line assemblage together a number of threaded areas 36, 37 and 38, to receive respective screw members 19, 23 and 34, are provided. Also connector 3 and diode case 25 may be threaded so as to facilitate their mounting to the assemblage as will be discussed hereinafter. Washers 4, 9 and 21 are insulators and serve to prevent electrical contact between terminal 3 or transition connector pin 22, subsequently to be discussed, and their respectively adjacent ground plates.

Flat conductive members 6, 10, 15 and 18, forming the ground plates in respective strip-transmission lines, may be made of 1/16-inch brass and members 7, 8, 12, 13, 16 and 17 may be copper clad Tellite, an irradiated polyolefin with a dielectric constant of 2.35. In more detail, copper clad dielectric member 7, prior to assembling, has the clad removed from its underside except for etched area 20 which is generally tear shaped so as to overlap the aperture in dielectric 8 positioned over washer 21 and conductively engages strip conductor 33. The topside of member 7 is etched so as to leave only copper area 32 which, when assembled with paper thin dielectric 31 and ground plate 6, forms a by-pass capacitor that prevents R.-F. energy from going into the bias circuit, subsequently to be described. The thin layer of copper clad on the underside of lower dielectric member 8 is retained (not illustrated), and the thin layer of copper clad on its topside is etched to form copper conductor strip on path 33. It should be noted that, although in the device illustrated the underside copper clad on member 7 has been completely removed, except for the etched area 20, to avoid difficulties arising from the effects of mirror images on transmission line carriers, the clad originally on the underside of member 7 may be etched so as to provide a copper strip which will be supercoincident with that of strip 33 on the topside of member 8. Dielectric pair members 12, 13, and 16, 17 in the lower strip-transmission lines B and C are similarly etched.

Where the copper is either totally or partially removed from the Tellite, the tendency of the Tellite to warp is counteracted by the rigidity of the conductive ground plates 6 and 9. Alternatively, the underside copper layers originally on members 8 and 13 may, themselves, be used to form ground plates instead of the separate ground plates 10 and 15.

Input and output ports may be formed by a standard Type N connector 3, which acts as the transition means from a coaxial line to the strip transmission line. The connector 3 is fixedly mounted on the strip transmission line assemblage 35 by screws 19. Insulating Teflon washer 4 and connector 3, in the assembled condition, pass through connector aperture 5, while Teflon washer 9 passed through aperture 11, so that connector 3 conductively engages conductive strip 14 etched on dielectric plate 13.

Referring now to the mounting of the diodes, FIG. 1 shows a typical arrangement in which a pill varactor diode, such as a type MA4333, is used as the unidirectional conductive means 29. The lower end of diode 29 contacts conductor 33 via aperture 30, while the upper end of the diode 29 contacts the lower end of the mechanically biasing bellows 28, the latter of which urges diode 29 against conductor 33. Bellows 28 is metallic and is housed by metallic cap 27 which seats itself on copper by-pass area 32 thereby making electrical contact therewith. Insulator cap 26 prevents electrical contact of cap 27 and diode housing 25, the latter of which contains members 26, 27, 28, and 29 and is fixedly mounted to assemblage 35 by screws 34. Electrical contact is avoided between screw 34 and member 32 by etching enlarged circular areas 39 around holes 38. Bias potential for varactor diode 29 may be applied at Microdot connector 24. The illustrated diode 29 and the other diodes constituting the switch are biased in accordance with a predetermined program as will be discussed in more detail hereinafter.

To provide interlayer strip-line connections, as for example between conductive paths 14 and 33 of transmission lines B and A, respectively, a conductive transition connector 22, cylindrically shaped and insulated by Teflon washer 21, is provided. The lower ends of connector 22 contacts path 14 of transmission line B and the upper end contacts etched area 20 which in turn contacts path 33 of transmission line A. Thus, a transition from strip to coaxial to strip line is made.

It is to be understood that the strip transmission line arrangement with connectors 3, transition connector 20, 21, 22 and varactor diode 29, etc., illustrated in FIG. 1 represent only one of a plurality of similar connectors, transitions, connectors and diodes which are schematically arranged as described in connection with FIG. 3.

Figure 2:
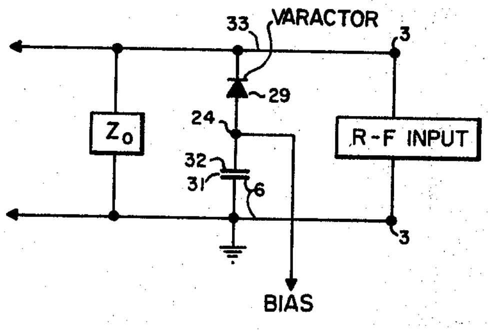
FIG. 2 shows an electrical circuit diagram of the fragmentary portion of the switch shown in FIG. 1.

FIG. 2, which represents the electrical equivalent of FIG. 1, shows an R.-F. input at terminals 3—3 across the serially connected circuit formed by diode 29 and the capacitor formed by members 6, 31, and 32. The Microdot connector 24 is at the common point between diode 14 and capacitor 6, 31 and 32. Also illustrated across the R.-F. input is a standard transmission line impedance $Z_0$ which represents the impedance looking to the next diode-capacitor arrangement in the circuit.

Figure 3:
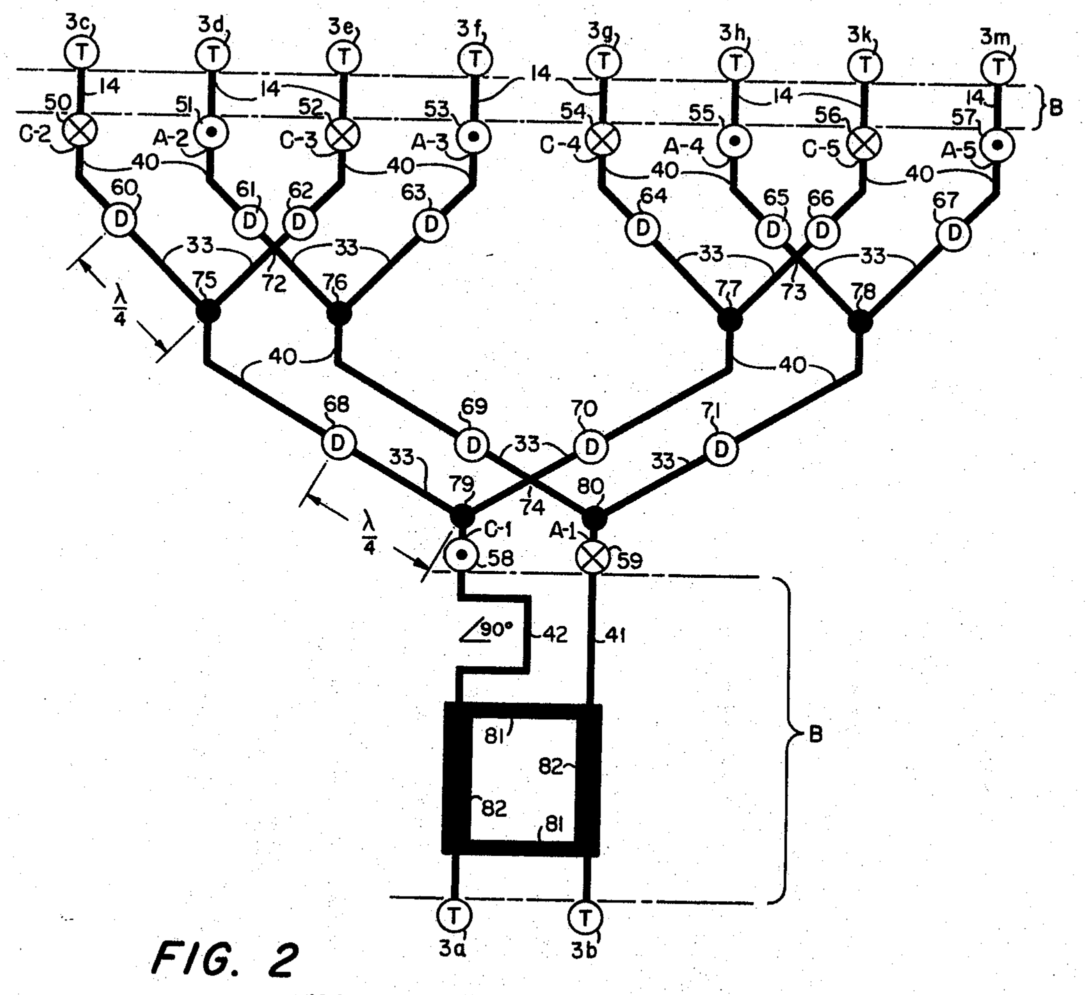
FIG. 3 shows a schematic arrangement of a transition-beam selector switch in accordance with the teachings of the present invention.

Turning now to FIG. 3, it may be seen that the selector switch forms a multi-input, double output microwave switch as illustrated. Input connectors 3*c* through 3*m* are adapted to be each coupled through appropriate means from energization from a respective signal source such, for example, as from a respective antenna of a receiving radar antenna array (not shown). Although the invention is described for use in connection with a radar antenna array, it is to be understood that the switch of the instant invention is also adaptable for use in many other electronic system where a multi-input, double output selector switch is desired. In operation, when signals are received by a pair of the input terminals 3*c*–3*m* a sum and difference of the signals are transmitted to output terminals 3*a*–3*b*. Output terminals, represented by numerals 3*a*–3*b*, as well as input terminals 3*c*–3*m*, correspond to the N-type conductor 3 discussed in connection with FIG. 1. Transition connectors shown as 22 in FIG. 1 are represented by numerals 50–59 in FIG. 3, with the circled crosses indicating transitions downward and circled dots as transitions upward. Diodes shown as 29 in FIG. 1 are represented by numerals 60–71 in FIG. 3; while conductive paths are represented by the same numbers 14 and 33 in both figures.

Reference numerals 75 through 80 represent points of electrical connection between strip conductors; whereas reference numerals 72 and 73 represent points in the switch assemblage 35 where strip conductors in different transmission lines crossover each other but do not make electrical contact, i.e., conductor 33 between junction 75 and diode 62 being on dielectric element 17 of transmission line C while conductor 33 between junction 76 and diode 61 is formed on dielectric 8 of transmission line A.

All strip conductors indicated at 33 in FIG. 3 leading from point C–1 and branching to points C–2, C–3, C–4 and C–5 are formed on the dielectric element 17 of transmission line C and are one-quarter (¼) wavelength of the operating R.-F. frequency of the signals received by input terminals 3*c*–3*m*. Strip conductors indicated at 14 in FIG. 3 from input terminals 3*c*–3*m* to C–2 through A–5, respectively are formed on the dielectric element 13 of transmission line B and are of equal length but need not necessarily be ¼ wavelength. And strip conductor indicated at 40 are formed on either dielectric 8 or dielectric 17 of transmission lines A and C, respectively, as shown in FIG. 3 and are of equal length in corresponding branches. For example, strips 40 between transition C–2 and diode 60. A–2 and diode 61, etc., are equal while those between junction 75 and diode 68, and junction 76 and diode 69, etc. are equal.

Connected between terminals 3*a*–3*b* and transition points 59–59 and etched on dielectric layer 13 of transmission line B is a quadrature hybrid 81–82 having a 90-degree line delay 41–42 connected to its input side. The length of strip conductor 42 is a quarter-wave length longer than strip conductor 41 so as to provide the 90 degree phase delay of the signal through conductor 42.

The operation of the switch may be described in connection with a radar antenna array as follows: at a given instant of time it is assumed that terminals 3*a* and 3*b* are to receive only the signals received at connectors 3*f* and 3*g* from the antenna array to which connectors 3*c*–3*m* are connected, a program of biases is applied to all the diodes so that diodes 63, 64, 69 and 70 are simultaneously reverse biased while concurrently all the other diodes are forward biased. Under these bias conditions, diodes 63, 64, 69 and 70 simulate an R.-F. open to pass the signals through to transition points 58 and 59 and thence to hybrid 81–82 and delay line 42; whereas, the other branches of the switch do not pass any signals because the forward biased diodes simulate an R.-F. short which, when reflected over a one-quarter (¼) wave length path, represents a high impedance as seen by each preceding function as is well known in the field of transmission lines. Hence, the input signals are fed along the appropriate conductive paths into hybrid 81–82 having a 90-degree line segment delay to sum-and-difference outputs 3*a* and 3*b*, respectively.

It is to be understood that due to the electrical circuitry involved in the switch as illustrated in FIG. 3 that only four (4) diodes will be rendered effectively conductive at any given instant of time, two (2) of the diodes being in the branches leading from transition connector 58 of which one diode must be either 68 or 70, and the other two (2) diodes being in the branches leading from transition connector 59 of which one (1) diode must be either 69 or 71.

Obviously, at a different instant of time the bias arrangement will be different in accordance with the bias program and a different pair of signals will be received at output terminals 3*a* and 3*b*, thus resulting in a multi-pole, multi-throw switch.

It is evident that the switch may be programmed to suit the needs of the particular system it is being used in. And although FIG. 3 shows a multi-pole, multi-throw switch having a particular arrangement of diodes, transition points and strip line paths, it too is intended to be illustrative rather than limiting since the design of a particular switch will be dependent on the needs of the system in which it is used. The use of the present invention in a radar system is merely by way of illustration since its use could reduce component installation costs and time in many other areas of the electronic art where programmed selector switches are employed.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A selector switch for selectively passing R.-F. energy and intended to function as a low-loss, broadband beam selector when used with an appropriate beam forming matrix for monopulse operation in radar scanning, said switch comprising:

a plurality of input terminals and two output terminals, hybrid means including conductive paths connected to said output terminals, a pair of conductive paths extending from said hybrid means, one of said pair of conductive paths forming a 90-degree signal delay line relative to the other of said pair of conductive paths, a first plurality of conductive lines each having one end thereof connected to said one conductive path at its extended end to form a first junction thereat, a second plurality of conductive lines each having one end thereof connected to said other conductive path at its extended end to form a second junction thereat, respective unidirectional conductive means electrically contacting each of said conductive lines at a predetermined distance from said first and second junctions, each of said unidirectional conductive means being electrically biased in accordance with a preselected program, each of said plurality of conductive lines having conductive branches extending therefrom, and coupling means connecting each of said conductive branches to a respective one of said input terminals,

2. The switch of claim 1 wherein said input terminals are arranged so that physically adjacent terminals are connected alternately to conductive branches of said first and second plurality of conductive lines.

3. The switch of claim 1 wherein an R.-F. bypass is operatively associated with each of said unidirectional conductive means so as to eliminate any effects of R.-F energy thereon.

4. The selector switch defined in claim 1, further including, several dielectric supporting means disposed in spaced relationship to each other, all of said conductive paths, conductive lines, and conductive branches being defined by conductive strips etched on predetermined selective ones of said dielectric supporting means, conductive means disposed on opposite sides of each of said dielectric means to form with said strips a plurality of strip-transmission lines, means assembling said plurality of transmission lines in a unitary structure to form a multilayer transmission line unit, and means for mounting all of said unidirectional conductive means on said unit at positions according to said predetermined distance.

5. The selector switch defined in claim 4, further including, a conductive strip area etched on said dielectric means at each of said predetermined positions for electrically contacting the respective unidirectional conductive means thereat, and insulating means superimposed over each of said etched strip areas and interposed between said strip areas and the superjacent one of said conductive means to form therewith an R.-F. by-pass capacitor which prevents R.-F. energy from affecting said unidirectional conductive means.

References Cited by the Examiner

UNITED STATES PATENTS

| | | | |
|---|---|---|---|
| 2,959,778 | 11/1960 | Bradley | 33—7 X |
| 3,192,530 | 6/1965 | Small | 343—854 |
| 3,255,450 | 6/1966 | Butler | 343—854 X |

OTHER REFERENCES

Electronics, Mar. 22, 1965, pp. 70–77.

HERMAN KARL SAALBACH, *Primary Examiner.*

ELI LIEBERMAN, *Examiner.*

P. L. GENSLER, *Assistant Examiner.*